US012231339B2

(12) United States Patent
Limaye et al.

(10) Patent No.: US 12,231,339 B2
(45) Date of Patent: Feb. 18, 2025

(54) EXTENSION OF OPENVSWITCH MEGAFLOW OFFLOADS TO HARDWARE TO ADDRESS HARDWARE PIPELINE LIMITATIONS

(71) Applicant: Intel Corporation, Santa Clara, CA (US)

(72) Inventors: Namrata Limaye, Fremont, CA (US); Venkata Suresh Kumar Paruchuri, Bangalore (IN); Sridhar Samudrala, Portland, OR (US); Kiran Patil, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 941 days.

(21) Appl. No.: 17/093,394

(22) Filed: Nov. 9, 2020

(65) Prior Publication Data
US 2021/0144094 A1 May 13, 2021

(51) Int. Cl.
*H04L 47/125* (2022.01)
*H04L 47/11* (2022.01)
(Continued)

(52) U.S. Cl.
CPC ............ *H04L 47/125* (2013.01); *H04L 47/11* (2013.01); *H04L 47/22* (2013.01); *H04L 47/2441* (2013.01)

(58) Field of Classification Search
CPC ....... H04L 47/125; H04L 47/11; H04L 47/22; H04L 47/2441; G06F 9/45558
See application file for complete search history.

(56) References Cited

U.S. PATENT DOCUMENTS

2015/0163144 A1* 6/2015 Koponen ............... H04L 49/252
370/237
2016/0094460 A1* 3/2016 Shelar ..................... H04L 45/56
370/392
(Continued)

OTHER PUBLICATIONS

European First Office Action, (EP Exam Report Article 94(3) EPC), for Patent Application No. 21198347.3, Mailed Jul. 24, 2023, 11 pages.
(Continued)

*Primary Examiner* — Jungwon Chang
(74) *Attorney, Agent, or Firm* — Compass IP Law PC

(57) ABSTRACT

Methods and apparatus for extending OpenvSwitch (OVS) megaflow offloads to hardware to address hardware pipeline limitations. Under a method implemented on a compute platform including a Network Interface Controller (NIC) having one or more ports and running software including OVS software and a Linux operating system having a kernel including a TC-flower module and a NIC driver a new megaflow is created with a mask in the OVS software employing a subset of microflow fields for a packet. The microflow fields and the megaflow mask is sent to the NIC driver. A new megaflow is implemented in the NIC driver employing a subset of the microflow fields and the NIC driver creates a new hardware flow on the NIC employing a packet match scheme using all the microflow fields. The NIC also programs a NIC hardware pipeline with the new hardware flow using a match scheme that may depend on the available hardware resources, such as the size of a TCAM.

15 Claims, 7 Drawing Sheets

(51) Int. Cl.
*H04L 47/22* (2022.01)
*H04L 47/2441* (2022.01)

(56) References Cited

U.S. PATENT DOCUMENTS

| | | | |
|---|---|---|---|
| 2016/0232019 A1* | 8/2016 | Shah | G06F 9/45558 |
| 2018/0083876 A1* | 3/2018 | Sharma | H04L 45/7452 |
| 2019/0012193 A1* | 1/2019 | van Leeuwen | G06F 9/45558 |
| 2019/0044866 A1 | 2/2019 | Chilikin et al. | |
| 2019/0327323 A1* | 10/2019 | Daly | H04L 49/70 |
| 2020/0059485 A1 | 2/2020 | Ergin et al. | |
| 2020/0328966 A1* | 10/2020 | Wang | H04L 45/745 |
| 2023/0269182 A1* | 8/2023 | Li | H04L 49/70 |
| | | | 370/392 |

OTHER PUBLICATIONS

Extended European Search Report for Patent Application No. 2119347.3, Mailed Feb. 23, 2022, 14 pages.

Horman Simon, et al., "OvS Hardware Offload with TC Flower", Nov. 16, 2017, Retrieved from the Internet: URL:http://www.openvswitch.org/support/ovscon2017/ horman.pdf, [retrieved on Feb. 15, 2022], 24 pages.

Horman Simon: "TC Flower Offload", Nov. 8, 2017, Netdev 2.2, The Technical Conference on Linux Networking, Retrieved from the Internet: URL:https://legacy.netdevconf.info/2.2/papers/horman-tcflower-talk.pdf, [retrieved on Feb. 15, 2022] , 3 pages.

Kumar Ram, Kaushik, et. al., "sNICh: Efficient Last Hop Networking in the Data Center", Architectures for Networking and Communications Systems (ANCS), 2010 ACM/IEEE Symposium ON, IEEE, Piscataway, NJ, USA, Oct. 25, 2010, 12 pages.

* cited by examiner

EXTENSION OF OPENVSWITCH MEGAFLOW OFFLOADS TO HARDWARE TO ADDRESS HARDWARE PIPELINE LIMITATIONS

BACKGROUND INFORMATION

OpenvSwitch (OVS) is a production quality multilayer virtual switch implemented with open source software. OVS provides complete switching functionality in the software, as well as hardware offload solutions to NICs (Network Interface Cards/Controllers). OVS is used by various cloud software providers as an offloading bare metal and virtual solution under which switching logic is move to NICs for better usage of cores and better system performance.

The current implementation of OVS supports two kinds of offloads using the Linux kernel TC-flower mechanism. "TC-flower" is a packet classifier implemented as a module in the Linux kernel and as part of the kernel TC subsystem (which includes the TC datapath). (It is called TC-"flower" because TC-flow was already taken.) One kind of offload is the "microflow" offload, which offloads all the fields used to classify a packet or flow supported in the OVS tables. Hence for every missed or new packet (e.g., first packet in a new flow) a different flow is installed. The second offload is a "megaflow" offload that offloads only a wild-card or a subset of the fields that match for a missed packet, hence supporting a larger number of packets/flows to match the same megaflow. The OVS sends these offloaded flows to the kernel TC-flower module, which creates a new megaflow and passes it on to the NIC driver for offload to the hardware.

A microflow contains all the fields of the packet that can be offloaded, even when the value is 0. When a missed packet comes in it is matched on all the fields. An example of a 7-tuple microflow is: Src Mac (Source MAC address), Dst Mac (Destination MAC address), Eth (Ethernet) type, Src IP (Source Internet Protocol address), Dst IP (Destination IP address), Src Port, Dst port.

A megaflow comprises a subset of these fields that are matched in the hardware. For the 7-tuple microflow, a megaflow would be a combination of one or more fields: e.g., Src IP/Mask, Dst IP/Mask.

There are some problems with this implementation. The microflow offload creates too many flows—one for each packet of similar kind even though only a simple mask could accommodate many packets. For example, an IP address mask is not offloaded and all packets with an IP address in the same subnet and type will have a different flow offloaded, hence using up memory in the hardware. The microflow offload may create millions of flows, hence requiring housekeeping counters and statistics to be maintained for all these flows separately, leading to reduced performance and increased overhead. For microflow offload using TC-flower, every missed packet must come up to the user space instead of the kernel, resulting in a significant drop in the performance. In addition, megaflows allow offloading of masks on all fields but require TCAM-based wildcard matching in hardware, which is expensive.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
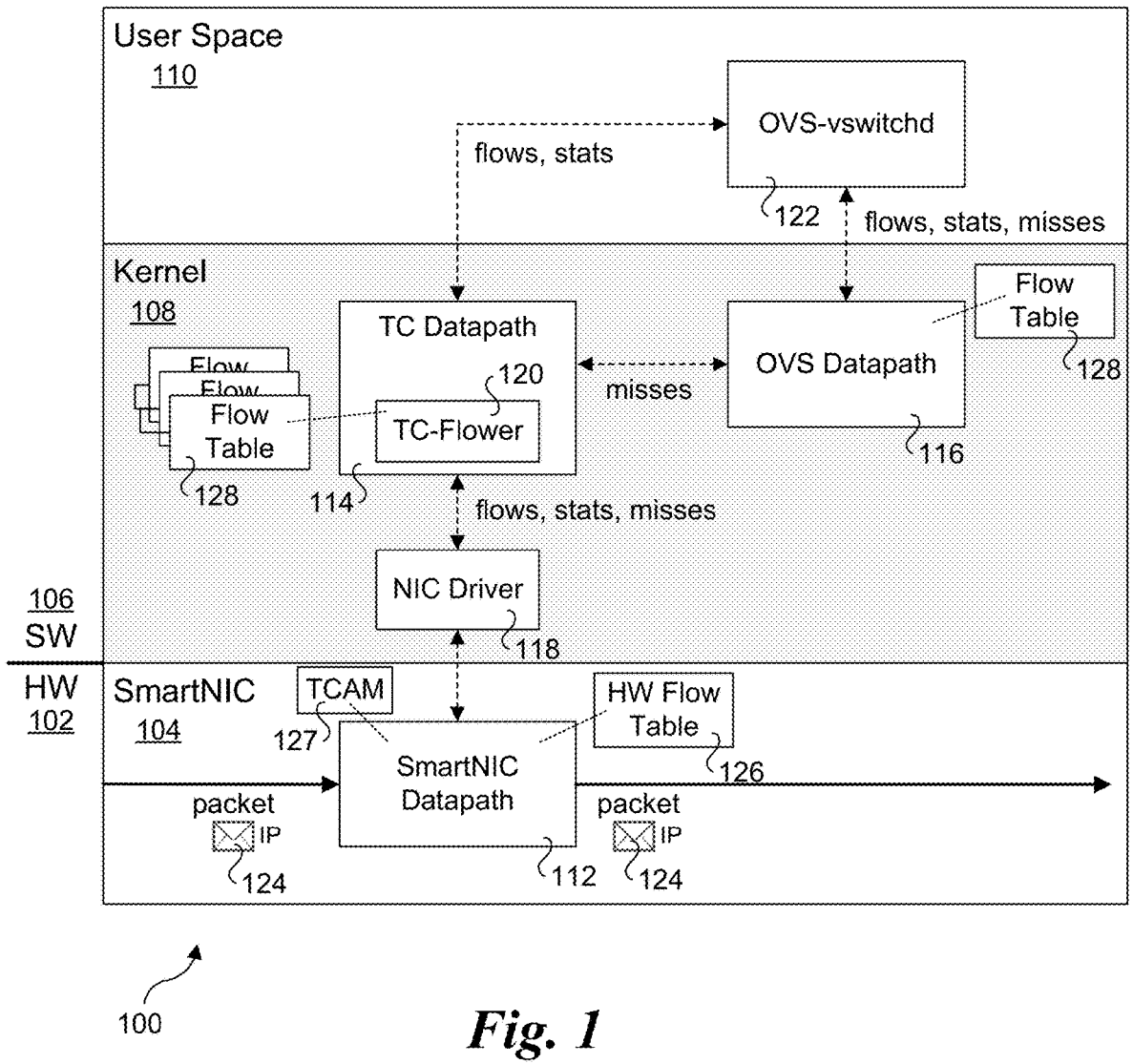
FIG. 1 is a schematic diagram of an architecture illustrating an overview of an implementation platform, according to one embodiment.

Embodiments of methods and apparatus for extending OpenvSwitch megaflow offloads to hardware to address hardware pipeline limitations are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, solutions are provided for extending OpenvSwitch megaflow offloads to hardware to address hardware pipeline limitations. In one aspect, an embodiment of the solution moves the control of the offloaded fields in the flow from OVS to the NIC driver by providing flexibility in the megaflow offloads. With little changes in this mode, OVS can send all the fields to the kernel TC-flower module along with an applicable mask for all or selected fields. Under one embodiment, OVS also calculates the fields from the mask and sends the subset of the fields to TC-flower module. The TC-flower module in Linux is adapted to support this new mode, including functionality to calculate and store the subset of the fields in the TC-flower module to implement a new megaflow. The TC-flower module also sends all the fields with mask(s) down to the NIC driver. Once the NIC driver receives all the fields, it can decide how to break the flow down to make it more suitable to the NIC hardware.

The solutions provide several advantages over existing TC-flower implementations. For example, instead of getting restricted by the two megaflow and microflow offload modes that OVS currently supports, neither of which is providing an optimal offload solution, NIC vendors can use this model to move the decision making of the fields to their NIC drivers. In this case, since the OVS and TC layers will save only megaflows, memory utilization and performance will be improved. For instance, the stats and counters (revalidator thread in OVS) will run only for megaflows (in 10 Ks) instead of the millions of microflows. Also, with some changes in the TC layer, a missed packet can match a megaflow in TC-flower and can be offloaded from the kernel instead of going up to the user space.

FIG. 1 shows an architecture 100 illustrating an overview of an implementation platform, according to one embodiment. Architecture 100 includes a hardware layer 102 including a smart NIC (aka SmartNIC) 104 and a software layer 106 including an operating system (OS) kernel 108, and a user space 110. Under architecture 100, the OS is Linux and kernel 108 is a Linux kernel. The datapath components including a SmartNIC datapath 112 in SmartNIC 104, and a TC datapath 114 and an OVS datapath 116 in kernel 108. Kernel 104 further includes a NIC driver 118 and TC-flower classification module 120 (alternatively referred to herein as "TC-flower" for brevity) in TC datapath 114. An OVS-vswitchd 122 is deployed in user space 106. OVS-switched is a daemon that manages and controls any number of OVS switches on a local machine.

In accordance with receive-side processing, packets such as an IP packet 124 are received from one or more networks at one or more network ports on SmartNIC 102 (not shown), and forwarded to SmartNIC datapath 108, which is abstraction representing various logic for implementing associated packet-processing functionality in SmartNIC 102. Fields in the packet header of IP packet 124 are inspected to perform packet classification for IP packet 124. If IP packet 120 belongs to an existing flow in a hardware flow table 126 for which hardware offloading has been previously set up, IP packet 124 will be processed in accordance with its previous classification using hardware-based logic in SmartNIC 104.

The packet lookup or match may also employ a TCAM (ternary content-addressable memory) 127 or a TCAM/WCM (wildcard match) table or component in parallel with hardware flow table 126 that employs a single field such as an IP address or reduced number of fields using the field values or a wildcard mask. Hardware flow table 126 may generally be implemented using a hash-based scheme, such as a hash of a concatenation of the header fields used for the classification, e.g., an n-tuple hash or a hash comprising a concatenation of a portion of the n-tuple fields. Other types of hashes may be used to avoid collisions and/or enhance efficiency, such as a Cuckoo hash scheme. Generally, the flow tables in hardware may be smaller than the flow tables in software.

If the packet classification for IP packet 124 performed by SmartNIC 104 results in a miss (e.g., IP packet 124 is a first packet in a new flow or a packet in a flow for which hardware offloading has not been set up), processing for the packet is pushed up to TC datapath 114 via NIC driver 118. If IP packet 124 belongs to an existing flow in TC datapath 114 it will be handled there. For a TC-flow implementation, as described below, TC-flower module 120 may employ multiple linked flow tables 128.

In cases where the flow lookup/match for packet 124 at TC datapath 114 results in a miss, processing of the packet will be pushed to OVS datapath 116. Under current OVS implementations, OVS datapath 116 employs a single large, flat flow table 130. If there is a hit in flow table 128 for OVS datapath 112, packet processing will be performed there. If there is a miss, processing will be pushed to OVS-vswitchd 118. This daemon will then determine how to handle the packet (and associated flow). Generally, it will try to program a flow into TC datapath 114, which would be pushed down to SmartNIC datapath 112 via NIC driver 118 if successful. If this fails for some reasons, then the flow will be programmed using OVS datapath 116.

Figure 2:
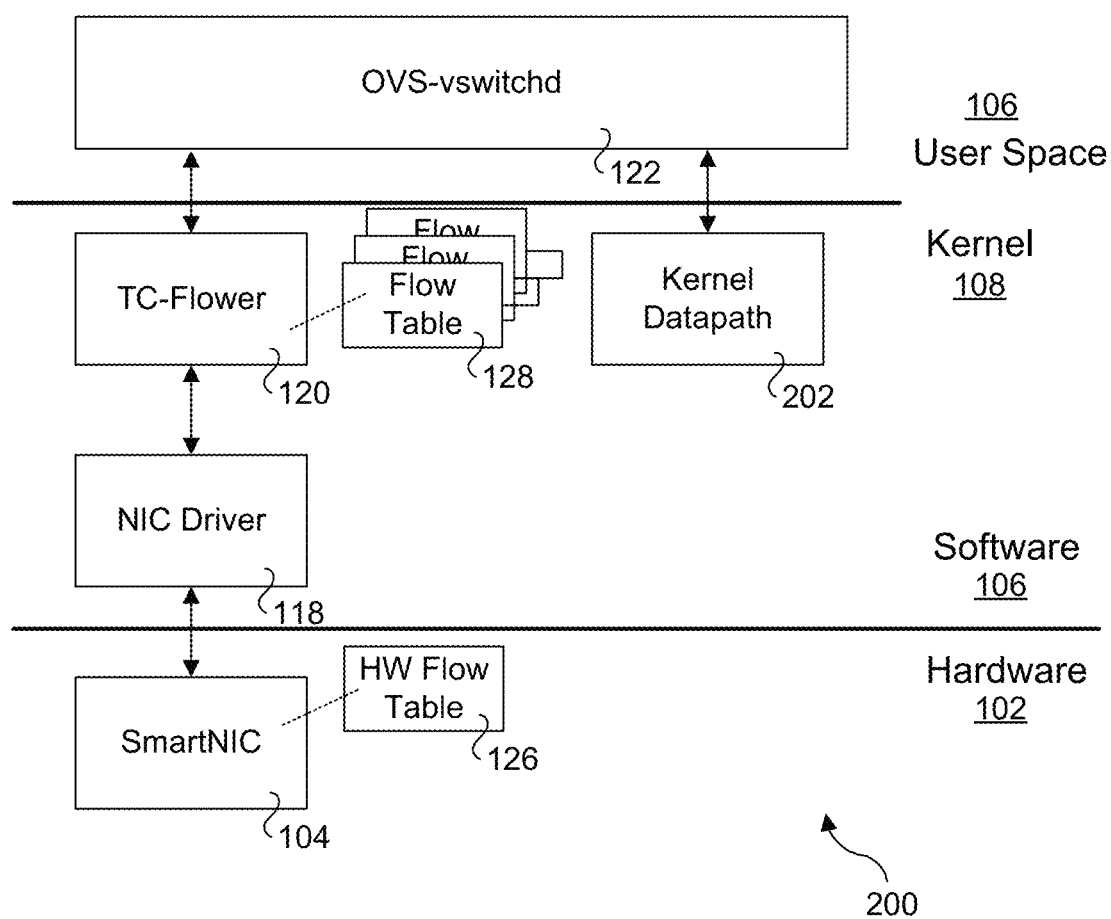
FIG. 2 is a diagram of a control plane view illustrating a packet processing path employing a TC-flower module.

FIG. 2 shows a control plane view 200 illustrating a packet processing path employing TC-flower 120. The components include SmartNIC 104 in hardware layer 102, NIC driver 118, TC-flower 120, and a kernel datapath 204 in kernel 108, and OVS-vswitchd 122 in user space 110. Under this view, OVS-vswitchd 122 will first try to push the flow to TC flower 120. It will then try to push the flow down to NIC driver 118, which in turn will try to push it down to SmartNIC 104. If any of these three stages fail, OVS-vswitchd 122 will push the packet to kernel datapath 204.

As discussed above, under one aspect of the solution the functionality of TC-flower is extended. Under one embodiment, changes are made in OpenvSwitch's TC-flower interface to send all fields in the megaflows and their masks in an 'enable-megaflows' like option to the TC-flower module. In addition, the OVS-vswitchd daemon and the TC datapath flow are modified to add an interface to send all fields in the megaflows along with their masks. Under another aspect, the TC-flower classifier module is extended to add the flow as a megaflow in the TC datapath, but pass all the fields along with the masks to the NIC driver. This means changes in TC-flower module in the Linux kernel to receive the mask and all the fields in the megaflow offloads. This includes changes to apply the mask within TC-flower to save the megaflow (subset of fields) in the TC layer. This will also employ changes to pass all the fields and the mask to the NIC driver. For example, in one embodiment the changes are implemented via an 'ndo_setup_tc' callback.

In accordance with another extension, on receiving a missed packet, TC-flower matches the packet and forwards it using software based on a megaflow rule. In addition to this, the TC datapath will be extended to add a microflow rule to hardware via the NIC driver interface.

Changes are also made to the NIC driver. Under one aspect, the NIC driver is modified to maintain the megaflow to hardware flow mapping and process deletes and counters based on this mapping. Further modifications to the NIC driver are added to support the following.

Under one embodiment of Flow Add, all the fields will be offloaded to the NIC driver with the mask. The NIC driver creates a megaflow to hardware flow mapping and saves it internally within the driver memory space and offloads the flow to the hardware.

Under one embodiment of Flow Delete, when the flow delete is received from OVS for a megaflow, the NIC driver will walk the above megaflow to hardware flow mapping table and delete all the hardware flows associated with that megaflow. On flow deletes received from hardware, the NIC driver will delete the hardware flow and dereference its mapping to the megaflow.

Usage of Flow Statistics/Counters are also modified. Under one embodiment, on the request for the counters for megaflow from OVS, the NIC driver will collect statistics for the microflows and add those for the megaflow counters and send those as a reply to OVS.

Figure 1A:
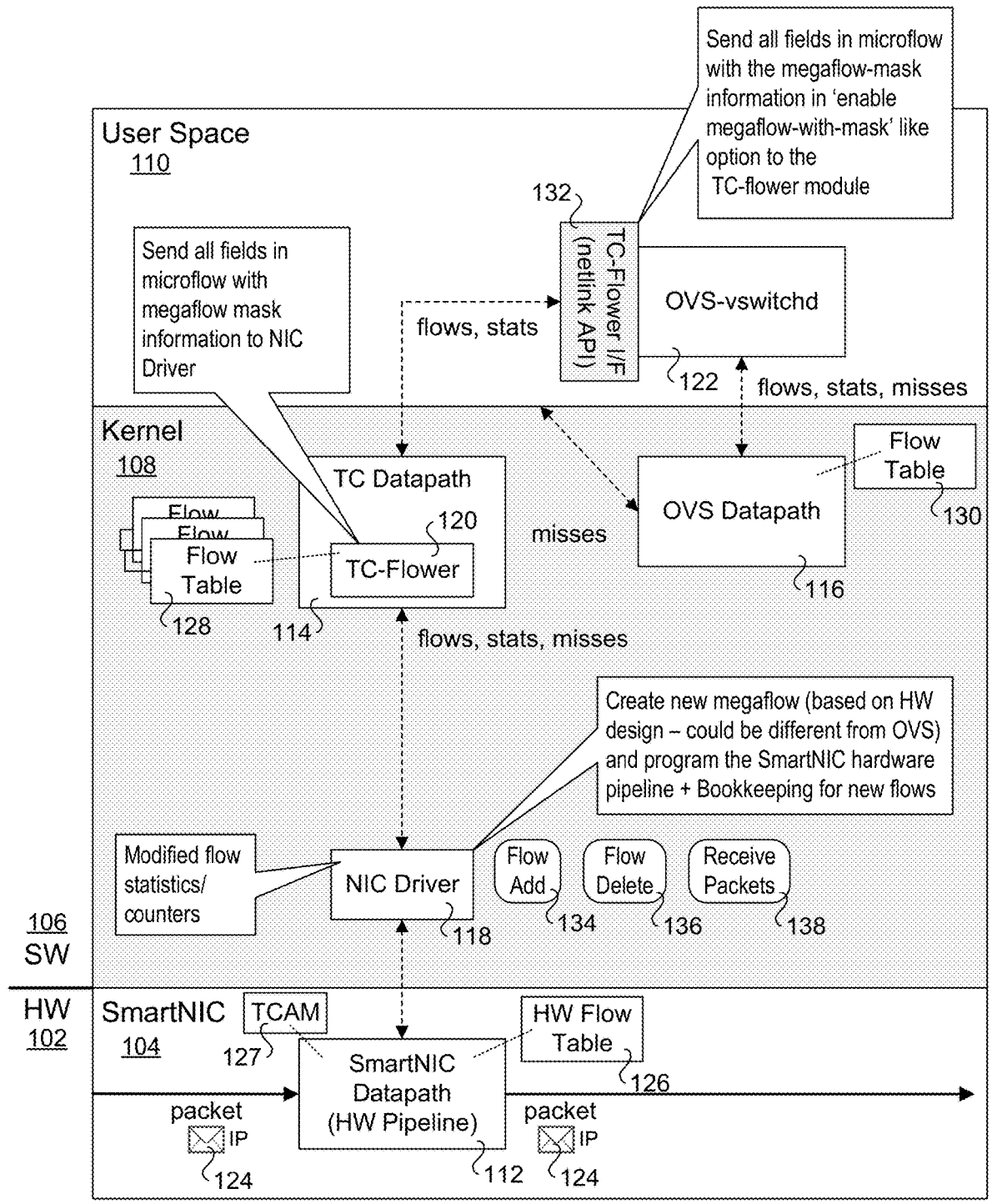
FIG. 1a is a schematic diagram illustrating an augmented architecture of FIG. 1 including extensions and new functions implemented by various software and hardware components.

FIG. 1a shows an augmented architecture 100a in which the foregoing extensions and changes are implemented. A TC-flower interface (I/F) 132 is coupled to OVS-vswitchd 122 (or otherwise implemented in OVS-vswitchd 122) and is configured to send all fields in the microflow with the megaflow mask information in 'enable-megaflow-with-mask' like option to TC-flower module 120. In one embodiment, TC-flower interface 132 employs a netlink API (Application Program Interface). TC datapath 114 has been modified to add a microflow rule to hardware via its NIC driver interface (not separately shown). TC flower 120 is also configured to send all fields in the microflow with megaflow mask information to NIC driver 118. The functionality of NIC driver 118 has been extended by a Flow Add function 134, a Flow Delete function 136, and a Receive Packets function 138. The flow statistic/counter function in NIC driver 118 has also been modified in the manner described above.

Figure 3:
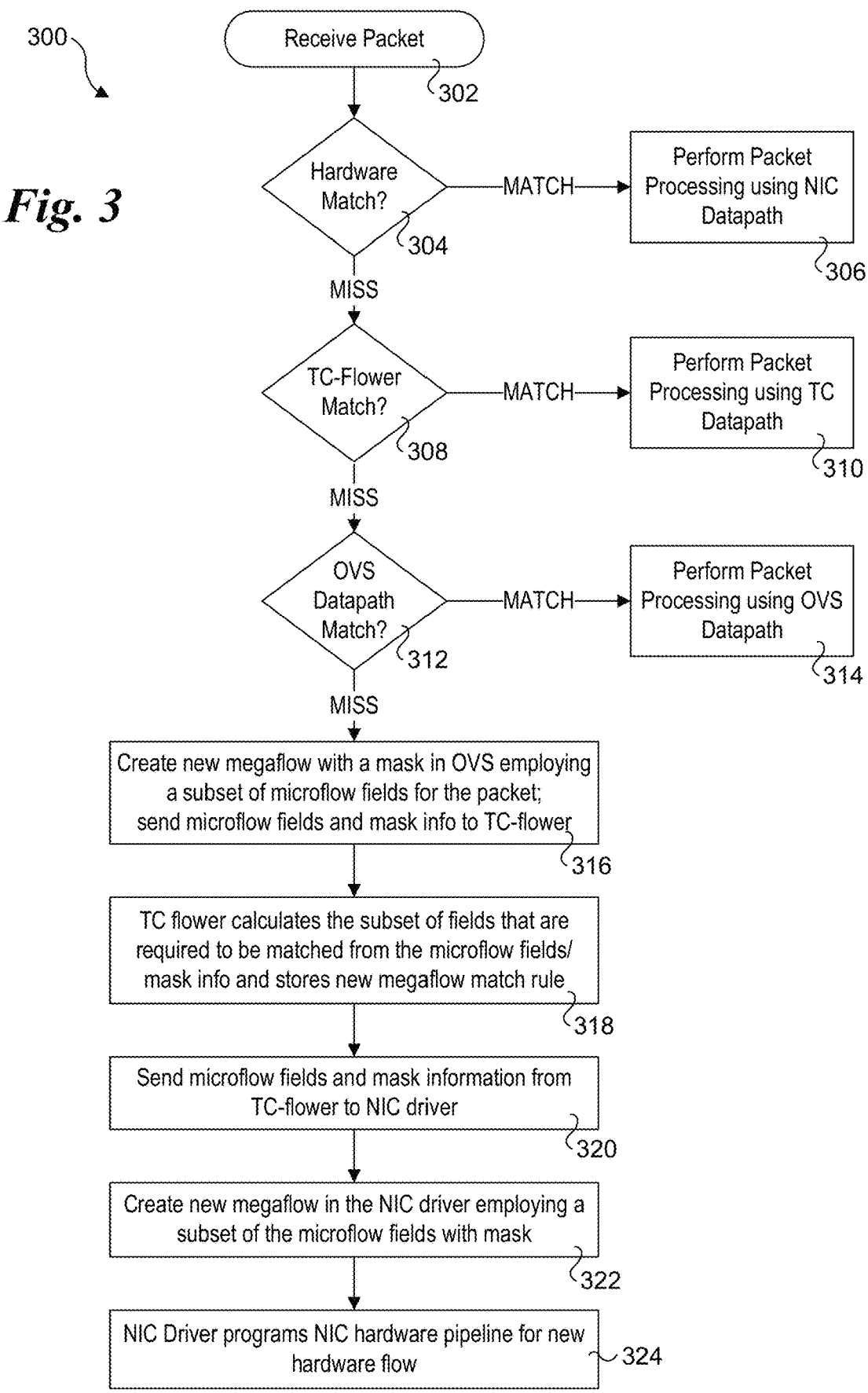
FIG. 3 is flowchart illustrating operations and logic for processing a packet including creating a new megaflow, according to one embodiment

FIG. 3 shows a flowchart 300 illustrating operations and logic for processing a packet including creating a new megaflow, according to one embodiment. The process begins in a start block 302 in which a packet is received. In a decision block 304 a determination is made to whether there is a hardware match for the packet (e.g., there is an entry in hardware flow table 126 for a flow to which the packet belongs). If there is a match, the logic proceeds to a block 306 in which packet processing is performed using the NIC datapath.

When there is a miss for decision block 304, the logic proceeds to a decision block 308 in which a TC-flower match is evaluated. This will generally involve a lookup for a matching megaflow entry in one of flow tables 128. If there is a match the logic proceeds to a block 310 in which packet processing is performed using TC datapath 114.

When there is a miss for decision block 308, the logic proceeds to a decision block 312 in which an OVS datapath match is evaluated. This will generally involve a lookup for a matching megaflow entry in flow table 130. If there is a match the logic proceeds to a block 314 in which packet processing is performed using OVS datapath 116.

For packets corresponding to new flows or to flows that have been purged, the result for each of decision blocks 304, 308, and 312 is a miss and the logic will proceed to a block 316 in which a new megaflow with a mask is created in OVS (e.g., using OVS-vswitchd 122) employing a subset of the microflow fields for the packets. The microflow fields are the fields that would be used for an n-tuple microflow, e.g., the seven fields for the 7-tuple microflow example discussed in the BACKGROUND section. OVS-vswitchd 122 will then send the microflow fields and the mask information to TC-flower 120.

In a block 318, TC flow calculates the subset of fields that are required to be matched from the microflow fields and the mask information and stores a corresponding match rule for the new megaflow. TC-flower 120 will then send the microflow fields and mask information to the NIC driver, as shown in a block 320.

The next two operations in blocks 322 and 324 are performed by the NIC driver. In block 322, a new megaflow is created in the NIC driver employing a subset of the microflow fields with a mask. The NIC driver then programs the NIC hardware pipeline implemented for SmartNIC datapath 112 for the new hardware flow, as depicted in a block 324. Under one aspect, the new megaflow will be created in consideration of the hardware resources on SmartNIC 104, such as the sizes of TCAM 127 (or a TCAM/WCM component) and hardware flow table 126. For example, the match scheme may be implemented by splitting the microflow fields, wherein one or more fields are used to create a mask that is stored as a new entry in TCAM 127, and all or a portion of the remaining fields are used to create a new entry in hardware flow table 126. Generally, the larger the available TCAM, the more a wild card match or other type of mask may be used.

Figure 4:
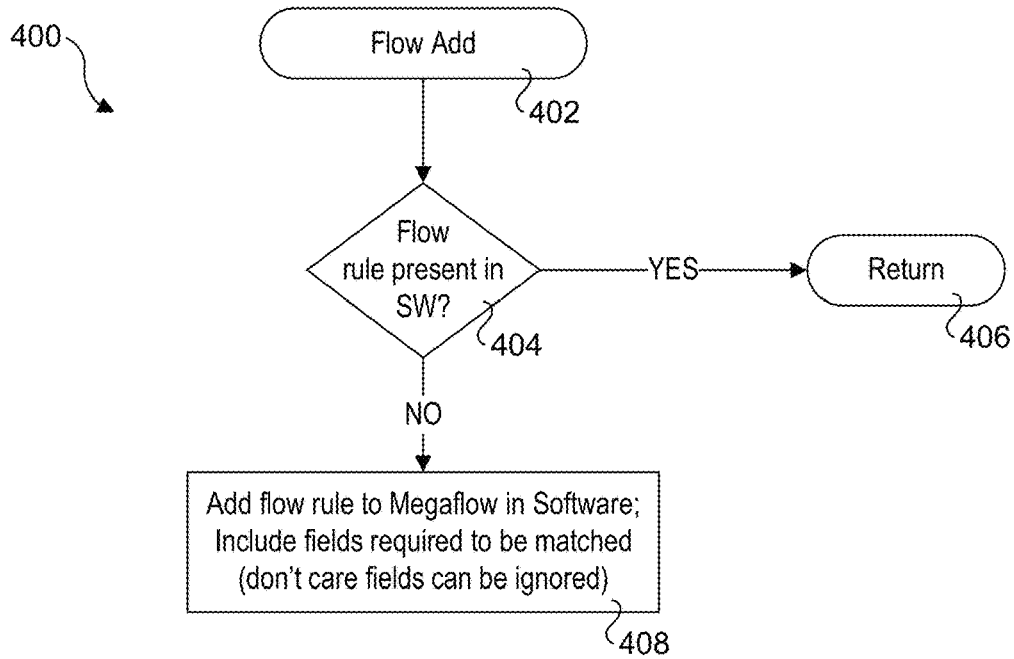
FIG. 4 is a flowchart illustrating operations and logic for implementing a Flow Add function, according to one embodiment.

FIG. 4 shows a flowchart 400 illustrating operations and logic for implementing Flow Add function 134, according to one embodiment. The process begins in a Flow Add start block 402. In a decision block 404 a determination is made to whether the flow rule is already present in software. If it is, the answer to decision block 404 is NO and the process returns, as depicted by a return block 406. If the flow is not present in software, the logic proceeds to a block 408 in which the flow rule is added to a megaflow in software. This includes the fields required to be matched, while other fields (don't care fields) may be ignored.

Figure 5:
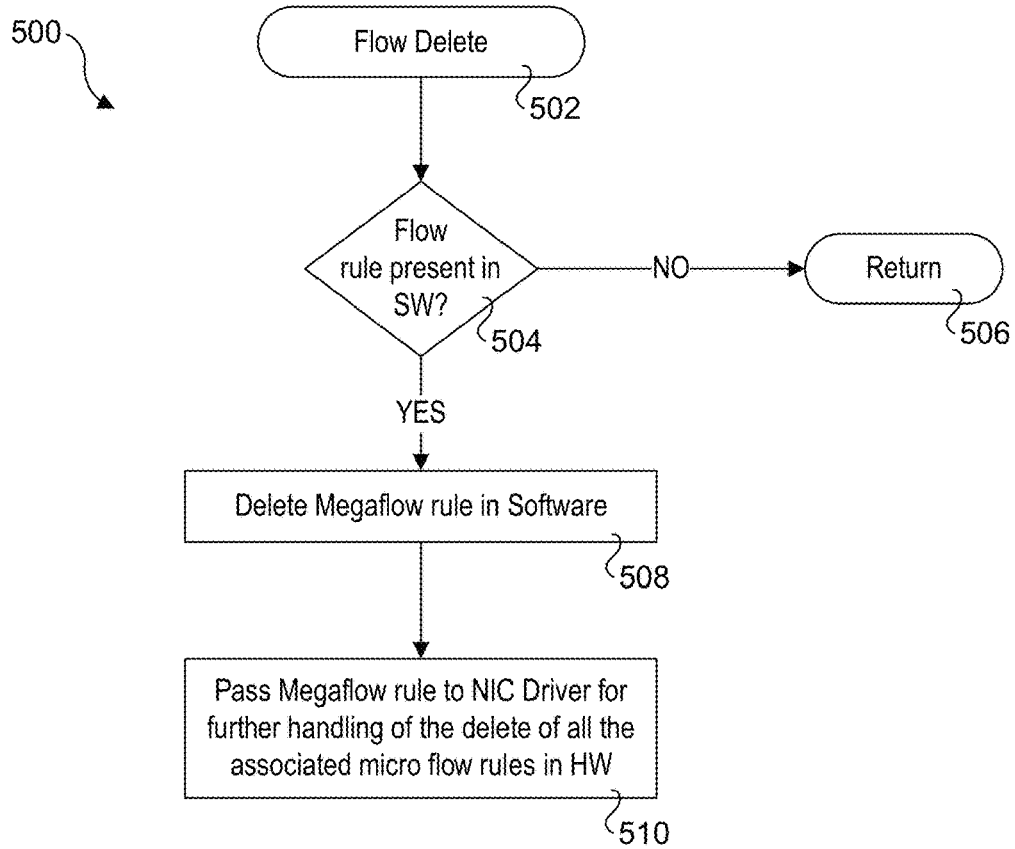
FIG. 5 is a flowchart illustrating operations and logic for implementing a Flow Delete function, according to one embodiment.

FIG. 5 shows a flowchart 500 illustrating operations and logic for implementing Flow Delete function 136, according to one embodiment. The process begins in a Flow Delete start block 502. In a decision block 504 a determination is made to whether the flow rule is already present in software. If it is not present, the answer to decision block 504 is NO and the process returns, as depicted by a return block 506. If the flow is present in software, the logic proceeds to a block 508 in which the applicable megaflow rule is deleted in software. As shown in a block 510, the megaflow rule will be passed to the NIC driver for further handling of deletion of all the microflows associated with the megaflow rule in hardware (e.g., on the SmartNIC).

Figure 6:
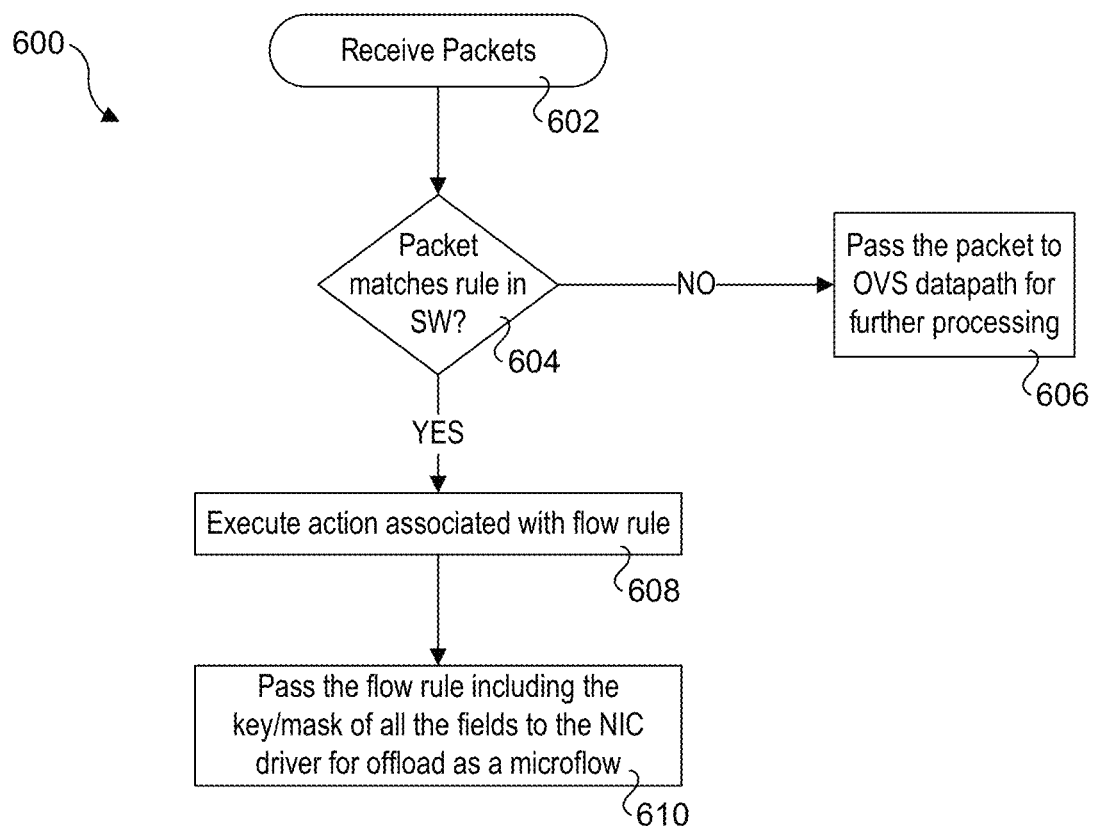
FIG. 6 is a flowchart illustrating operations and logic for implementing a modified datapath flow for Receive Packets function, according to one embodiment.

FIG. 6 shows a flowchart 600 illustrating operations and logic for implementing a modified datapath flow for Receive Packets function 138, according to one embodiment. The process begins in a receive packets start block 602. In a decision block 604 a determination is made to whether the packet (header fields) match a rule in software. If not (answer NO), the packet is passed to the OVS datapath for further processing in a block 606. If the packet matches a rule in software, the answer to decision block 604 is YES and the logic proceeds to a block 608 in which an action associated with the flow rule is executed. The logic then proceeds to a block 610 in the flow rule including the key/mask of all the applicable fields is passed to the NIC driver for offload as a microflow.

Example Compute Platform

Figure 7:
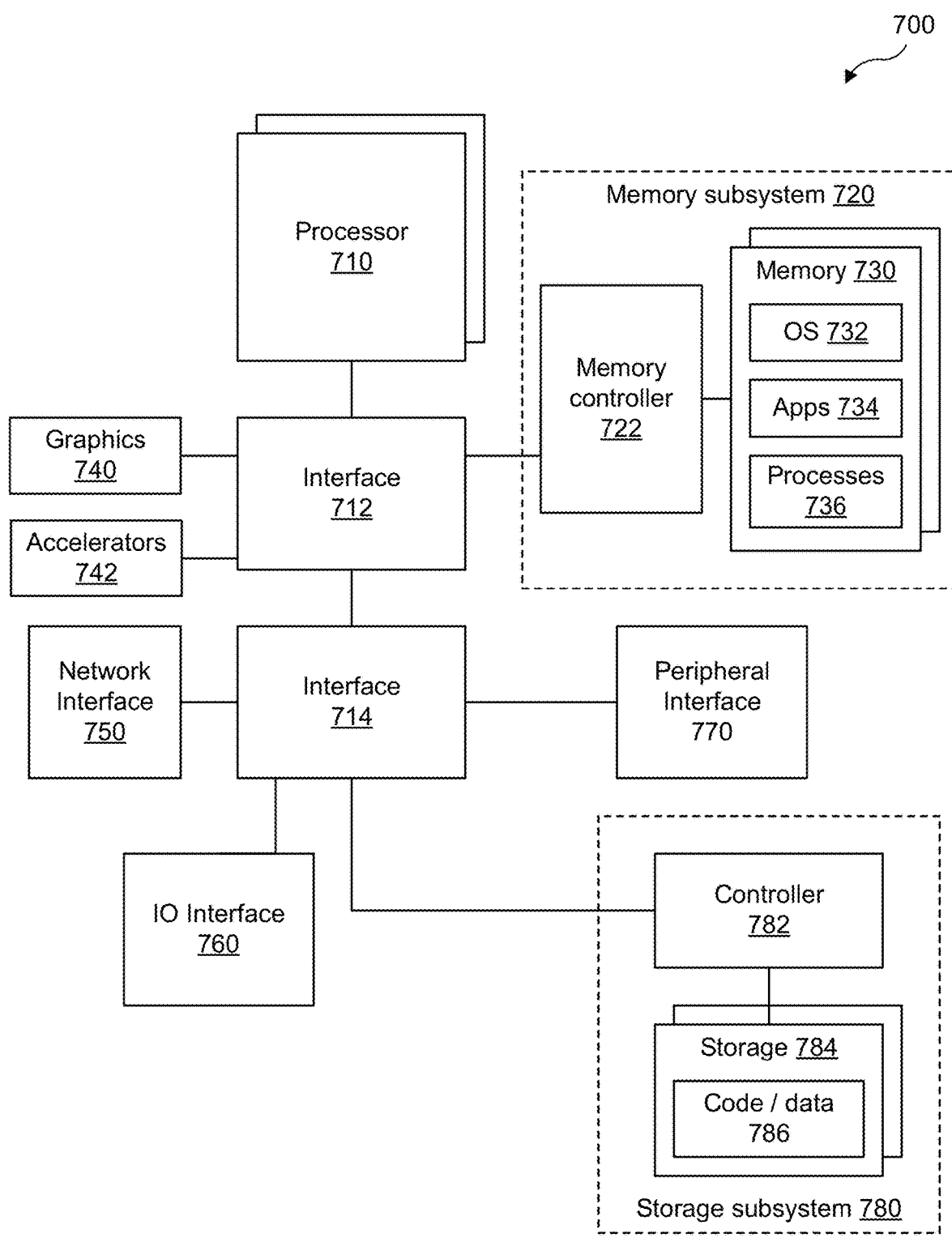
FIG. 7 is a diagram of a platform or server system that may be implemented with aspects of the embodiments described and illustrated herein.

FIG. 7 depicts a compute platform 700 in which aspects of the embodiments disclosed above may be implemented. Compute platform 700 includes one or more processors 710, which provides processing, operation management, and execution of instructions for compute platform 700. Processor 710 can include any type of microprocessor, central processing unit (CPU), graphics processing unit (GPU), processing core, multi-core processor or other processing hardware to provide processing for compute platform 700, or a combination of processors. Processor 710 controls the overall operation of compute platform 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, compute platform 700 includes interface 712 coupled to processor 710, which can represent a higher speed interface or a high throughput interface for system components that needs higher bandwidth connections, such as memory subsystem 720 or optional graphics interface components 740, or optional accelerators 742. Interface 712 represents an interface circuit, which can be a standalone component or integrated onto a processor die. Where present, graphics interface 740 interfaces to graphics components for providing a visual display to a user of compute platform 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

In some embodiments, accelerators 742 can be a fixed function offload engine that can be accessed or used by a processor 710. For example, an accelerator among accelerators 742 can provide data compression capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 742 can provide multiple neural networks, CPUs, processor cores, general purpose graphics processing units, or graphics processing units can be made available for use by AI or ML models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of compute platform 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in compute platform 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for compute platform 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that compute platform 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, compute platform 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides compute platform 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720. In one embodiment, Network Interface is a SmartNIC configured and operations in a similar manner to SmartNIC 104.

In one example, compute platform 700 includes one or more IO interface(s) 760. IO interface 760 can include one or more interface components through which a user interacts with compute platform 700 (e.g., audio, alphanumeric, tactile/touch, or other interfacing). Peripheral interface 770 can include any hardware interface not specifically mentioned above. Peripherals refer generally to devices that connect dependently to compute platform 700. A dependent connection is one where compute platform 700 provides the software platform or hardware platform or both on which operation executes, and with which a user interacts.

In one example, compute platform 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (i.e., the value is retained despite interruption of power to compute platform 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to compute platform 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM, or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014), HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of compute platform 700. More specifically, power source typically interfaces to one or multiple power supplies in compute platform 700 to provide power to the components of compute platform 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, compute platform 700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel® QuickPath Interconnect (QPI), Intel® Ultra Path Interconnect (UPI), Intel® On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented on a compute platform including a Network Interface Controller (NIC) having one or more ports and running software including virtual switch software, a Linux operating system having a kernel including a Traffic Classification (TC)-flower module and a NIC driver, comprising:
    creating a new megaflow with a mask in the virtual switch software employing a subset of microflow fields for a packet;
    creating a new hardware flow on the NIC employing a packet match scheme using at least a portion of the microflow fields;
    receiving a first packet at a first port on the NIC;
    detecting the first packet does not belong to a current hardware flow;
    forwarding the packet from the NIC to the TC-flower module; and
    at the TC flower module,
        matching the first packet to a megaflow and forwarding the first packet to be processed using software based on a megaflow rule associated with the megaflow; and
        extending a TC datapath to add a microflow rule to the NIC via an interface on the TC flower module to the NIC driver.

2. The method of claim 1, further comprising:
    sending the microflow fields and the megaflow mask information to the TC-flower module;
    calculating, at the TC-flower module, a subset of fields required to be matched for the megaflow from the microflow fields and megaflow mask information and storing a corresponding match rule; and sending the microflow fields and the megaflow mask information from the TC-flower module to the NIC driver.

3. The method of claim 1, wherein the NIC includes a hardware pipeline configured to perform packet processing of packets belonging to flows offloaded to hardware, further comprising programming the new hardware flow in the hardware pipeline.

4. The method of claim 3, wherein the hardware pipeline includes a hardware flow table and programming the new hardware flow includes creating a new hardware flow table entry in the hardware flow table using at least a portion of the microflow fields.

5. The method of claim 4, wherein the hardware pipeline includes a TCAM (ternary content-addressable memory) or TCAM/WCM (Wildcard Match) component, and wherein programming the new hardware flow includes creating a new entry in the TCAM or TCAM/WCM employing a mask associated with at least one field not included among the portion of the microflow fields used for the new hardware flow table entry.

6. The method of claim 1, wherein the software includes a Linux operating system having a kernel including a NIC driver, wherein the NIC includes a hardware pipeline, and wherein the NIC driver implements a new megaflow employing a subset of the microflow fields.

7. The method of claim 1, further comprising:
receiving a second packet at the first port of the NIC, the second packet and the first packet belong to the same flow;
matching the second packet on the NIC; and
employing the new microflow rule to perform processing of the packet on the NIC.

8. The method of claim 1, wherein the software includes a Linux operating system having a kernel including a NIC driver, further comprising deleting a flow originating from the virtual switch software by performing operations comprising:
sending a flow delete for a megaflow from the virtual switch software to the NIC driver; and
deleting, via the NIC driver, all hardware flows on the NIC associated with the megaflow.

9. The method of claim 1, wherein the software includes a Linux operating system having a kernel including a NIC driver, further comprising deleting a hardware flow originating from the NIC by performing operations comprising:
sending a hardware flow delete from the NIC to the NIC driver; and
at the NIC driver,
deleting the hardware flow and dereferencing any hardware flow mappings to an associated megaflow.

10. A compute platform comprising:
a processor coupled to memory and a Network Interface Controller (NIC) and a storage device,
a Network Interface Controller (NIC) including one or more ports and configured to support hardware offload of packet processing using a hardware pipeline and including a hardware flow table and a TCAM (tertiary content addressable memory); and
software, residing in at least one of the memory and storage device, comprising a plurality of software components configured to be executed on the processor including a Linux operating system having a kernel including a Traffic Classification (TC)-flower module and OpenvSwitch (OVS) software, wherein execution of the software enables the compute platform to:
create a new megaflow with a mask in the OVS software employing a subset of microflow fields for a packet;
send the microflow fields and megaflow mask information to the TC-flower module;
send the microflow fields and megaflow mask information from the TC-flower module to a NIC driver;
implement a new megaflow in the NIC driver employing a subset of the microflow fields; and
employ the NIC driver to create a new hardware flow on the NIC employing a packet match scheme using at least a portion of the microflow fields.

11. The compute platform of claim 10, wherein the hardware pipeline includes a hardware flow table, and wherein creating the new hardware flow on the NIC comprises programming the new hardware flow in the hardware pipeline including creating a new hardware flow table entry using at least a portion of the microflow fields.

12. The compute platform of claim 11, wherein the hardware pipeline includes a TCAM (ternary content-addressable memory) or TCAM/WCM (Wildcard Match) component, and wherein creating the new hardware flow on the NIC further comprises creating a new entry in the TCAM or TCAM/WCM component employing a mask associated with at least one field not including any fields in the portion of the microflow fields used for the new hardware flow table entry.

13. The compute platform of claim 10, wherein the compute platform is further configured to:
receive a first packet at a first port on the NIC;
detect the first packet does not belong to a current hardware flow;
forward the packet from the NIC to the TC-flower module; and
via execution of software comprising the TC-flower module on the processor,
match the first packet to a megaflow and forward the first packet to be processed using software based on a megaflow rule associated with the megaflow; and
extend a TC datapath to add a microflow rule to the NIC via the NIC driver.

14. The compute platform of claim 10, wherein execution of the software further enables the compute platform to delete a flow originating from the OVS software by:
sending a flow delete for a megaflow from the OVS software to the NIC driver; and
deleting, via the NIC driver, all the hardware flows on the NIC associated with the megaflow.

15. The compute platform of claim 10, wherein execution of the software further enables the compute platform to delete a hardware flow originating from the NIC by:
receiving a hardware flow delete sent from the NIC to the NIC driver; and
at the NIC driver,
deleting the hardware flow and dereferencing any hardware flow mappings to an associated megaflow.

\* \* \* \* \*